(12) United States Patent
Shima

(10) Patent No.: US 7,174,041 B2
(45) Date of Patent: Feb. 6, 2007

(54) DIAGNOSTIC APPARATUS FOR ABNORMALITIES IN IMAGE RECOGNITION SYSTEM

(75) Inventor: Nobukazu Shima, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 840 days.

(21) Appl. No.: 10/421,083

(22) Filed: Apr. 23, 2003

(65) Prior Publication Data

US 2003/0202694 A1    Oct. 30, 2003

(30) Foreign Application Priority Data

Apr. 25, 2002    (JP) .............................. 2002-124615

(51) Int. Cl.
G06K 9/00    (2006.01)
G06K 9/68    (2006.01)

(52) U.S. Cl. .................................................. 382/168

(58) Field of Classification Search ............... 382/128, 382/131, 132, 168, 170, 173, 181, 218–219, 382/305; 358/500, 504, 521, 522, 523, 530
See application file for complete search history.

(56) References Cited

U.S. PATENT DOCUMENTS

| | | | |
|---|---|---|---|
| 4,933,983 A | | 6/1990 | Hiramatsu et al. |
| 5,596,654 A * | | 1/1997 | Tanaka ........................ 382/168 |
| 5,734,740 A * | | 3/1998 | Benn et al. .................. 382/132 |
| 6,088,473 A * | | 7/2000 | Xu et al. ..................... 382/132 |
| 6,215,900 B1 * | | 4/2001 | Schwenker et al. ......... 382/168 |
| 6,353,674 B1 * | | 3/2002 | Dewaele ...................... 382/132 |
| 6,449,390 B1 * | | 9/2002 | Inoue ........................... 382/168 |
| 2001/0008562 A1 * | | 7/2001 | Rogers et al. ............... 382/132 |
| 2003/0095695 A1 * | | 5/2003 | Arnold ......................... 382/131 |

FOREIGN PATENT DOCUMENTS

| JP | 62203461 | 9/1987 |
|---|---|---|
| JP | 06164846 | 6/1994 |
| JP | A-6-308036 | 11/1994 |
| JP | A-7-131651 | 5/1995 |
| JP | 2001016446 | 1/2001 |
| JP | A-2001-28746 | 1/2001 |
| JP | A-2001-43377 | 2/2001 |

* cited by examiner

Primary Examiner—Amir Alavi
(74) Attorney, Agent, or Firm—Fogg and Associates LLC; David N. Fogg

(57) ABSTRACT

A diagnostic apparatus in an image recognition system able to quickly and accurately detect breakage of a cable from an image sensor or pixel burn of an image sensor, provided with a histogram computing unit for performing predetermined computations on an image signal fetched into an image recognition unit to generate a density histogram and an abnormality judging unit for analyzing the density histogram generated by the histogram computing unit to judge the presence of an abnormality or alternatively provided with a memory unit for receiving as input and storing information of an image signal fetched into an image recognition unit and a comparing/judging unit for reading out and comparing information of image signals of a plurality of images different in time relating to a target pixel from the memory unit and judging whether they are the same or different and judging that there is an abnormality when they are the same.

19 Claims, 15 Drawing Sheets

TIME CONTROL

TIME t

TIME t+1

FIG.16
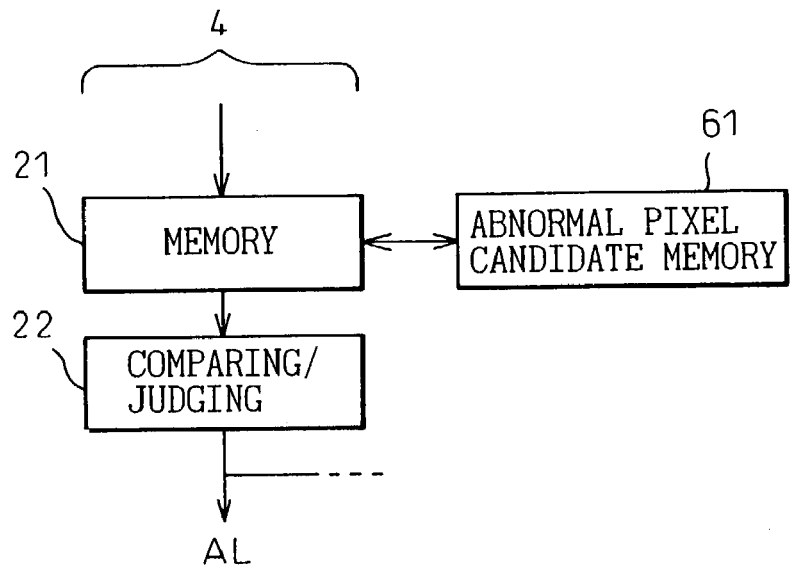
FIG.17(a)
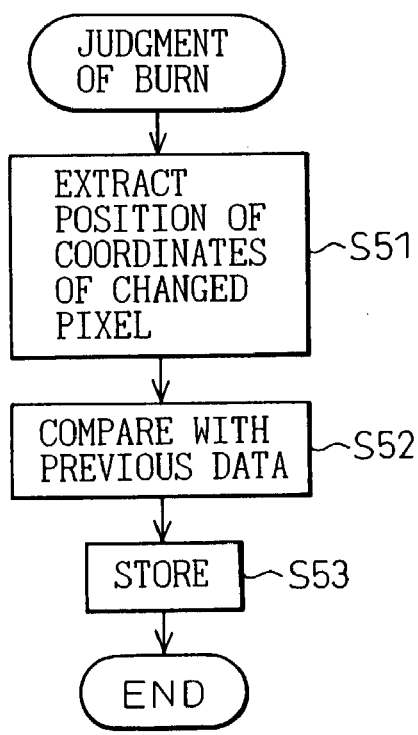
FIG.17(b)
INFORMATION OF
COORDINATES OF
UNCHANGED PIXELS
| x | y | VALUE OF PIXEL |
|---|---|---|
| 10 | 2 | 250 |
| 11 | 2 | 199 |
| ⋮ | ⋮ | |
| ⋮ | ⋮ | |
| | | |

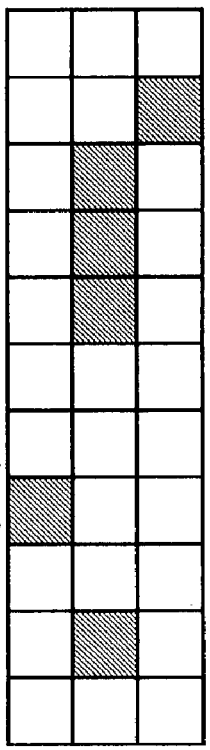
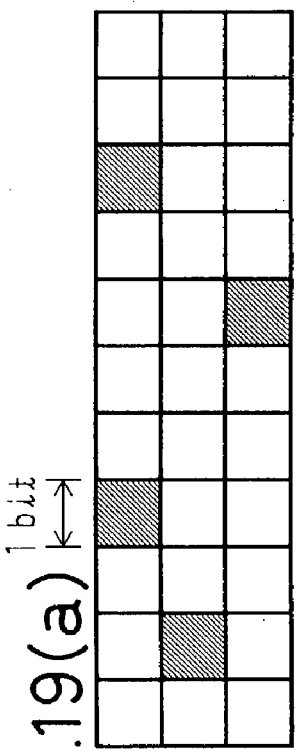
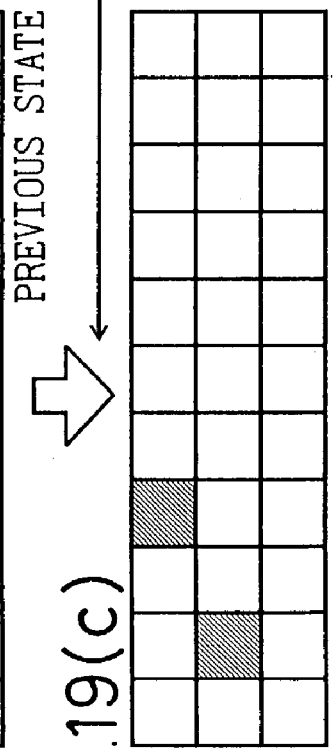
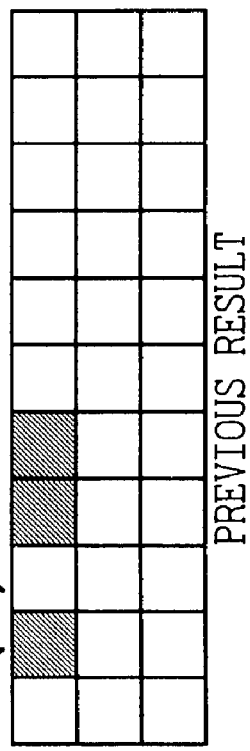
FIG.19(a) PREVIOUS STATE
FIG.19(b) PRESENT STATE
FIG.19(c) NEXT STATE
FIG.19(d) PREVIOUS RESULT

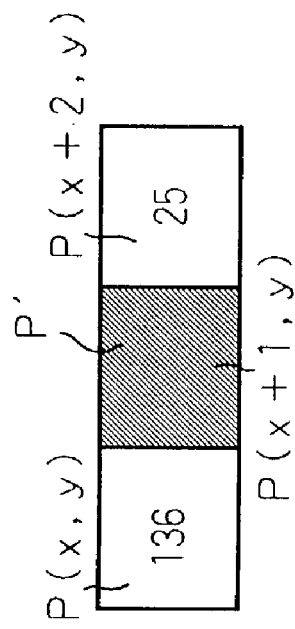
FIG.21(a)
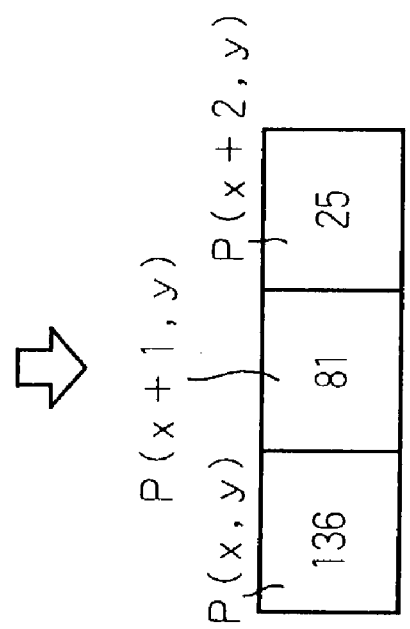
FIG.21(b)
$$\begin{bmatrix} \text{INTERPOLATION} \\ \text{FORMULA} \end{bmatrix} \quad P(x+1, y) = \frac{P(x, y) + P(x+2, y)}{2}$$
FIG.21(c)

DIAGNOSTIC APPARATUS FOR ABNORMALITIES IN IMAGE RECOGNITION SYSTEM

This application claims priority to Japanese Patent Application No. JP-2002-124615 filed on Apr. 25, 2002.

BACKGROUND OF THE INVENTION

1. Field of the Invention

The present invention relates to a diagnostic apparatus for abnormalities in an image recognition system.

2. Description of the Related Art

Image recognition systems are used in various fields. For example, they are mounted in vehicles to assist the safe cruising of the vehicles or are mounted in industrial robots to play important roles in automatic control of the robots. Below, the invention will be explained with reference to the example of an image recognition system mounted in a vehicle.

Image recognition systems mounted in vehicles are used to recognize the cruising environment in front of the vehicles or to measure the range to or azimuth of obstacles in front of the vehicles. In this case, an image input unit (camera) and image recognition unit (image recognition sensor) are essential for such image recognition systems.

Note that an image recognition sensor is also utilized as a hybrid sensor combined with milliwave or other radar used to assist vehicle cruising. Further, an image recognition sensor is also utilized as part of other control devices, for example, the automatic cruise control systems of vehicles similarly used to assist vehicle cruising.

Summarizing the problems to be solved by the invention, when certain components of the image input unit (camera) and image recognition unit, in particular the image input unit and the cable (normally an 8-bit cable) for connecting this with the image recognition unit, are mounted in a vehicle, they are subject to extremely harsh usage environments. Therefore, the probability of faults occurring the image input unit and cable becomes higher. This being the case, the problem arises that when the image recognition system is used for assisting vehicle cruising, the safety of the cruising vehicle is liable to be impaired by such faults or other abnormalities.

For example, the above problem may arise when for example one or more cords in the above 8-bit cable breaks, when there is pixel burn in the image sensor of the image input unit (camera), etc.

SUMMARY OF THE INVENTION

An object of the present invention is to provide a diagnostic apparatus for abnormalities in an image recognition system able to obtain a quick and accurate grasp of abnormalities.

To attain the above object, there are provided, as a first aspect of the invention, a diagnostic apparatus provided with a histogram computing means (11) for performing predetermined computations on an image signal fetched into an image recognition unit (3) to generate a density histogram and an abnormality judging means (12) for analyzing the density histogram generated by the histogram computing means (11) to judge the presence of an abnormality and, as a second aspect of the invention, a diagnostic apparatus provided with a memory means (21) for receiving as input and storing information of an image signal fetched into an image recognition unit (3) and a comparing/judging means (22) for reading out and comparing information of image signals of a plurality of images different in time relating to a target pixel from the memory means (21) and judging whether they are the same or different and, in that case, judging that there is an abnormality when they are the same.

BRIEF DESCRIPTION OF THE DRAWINGS

These and other objects and features of the present invention will become clearer from the following description of the preferred embodiments given with reference to the attached drawings, wherein:

FIG. 16 is a view of a diagnostic apparatus for abnormalities according to Embodiment C;

FIG. 17($a$) and FIG. 17($b$) are flow charts of an example of operation of Embodiment C;

FIG. 19($a$) to FIG. 19($d$) are views showing simply the operation of Embodiment D;

FIG. 21($a$) to FIG. 21($c$) are views for explaining interpolation in Embodiment H.

DESCRIPTION OF THE PREFERRED EMBODIMENTS

Preferred embodiments of the present invention will be described in detail below while referring to the attached figures.

Figure 1:
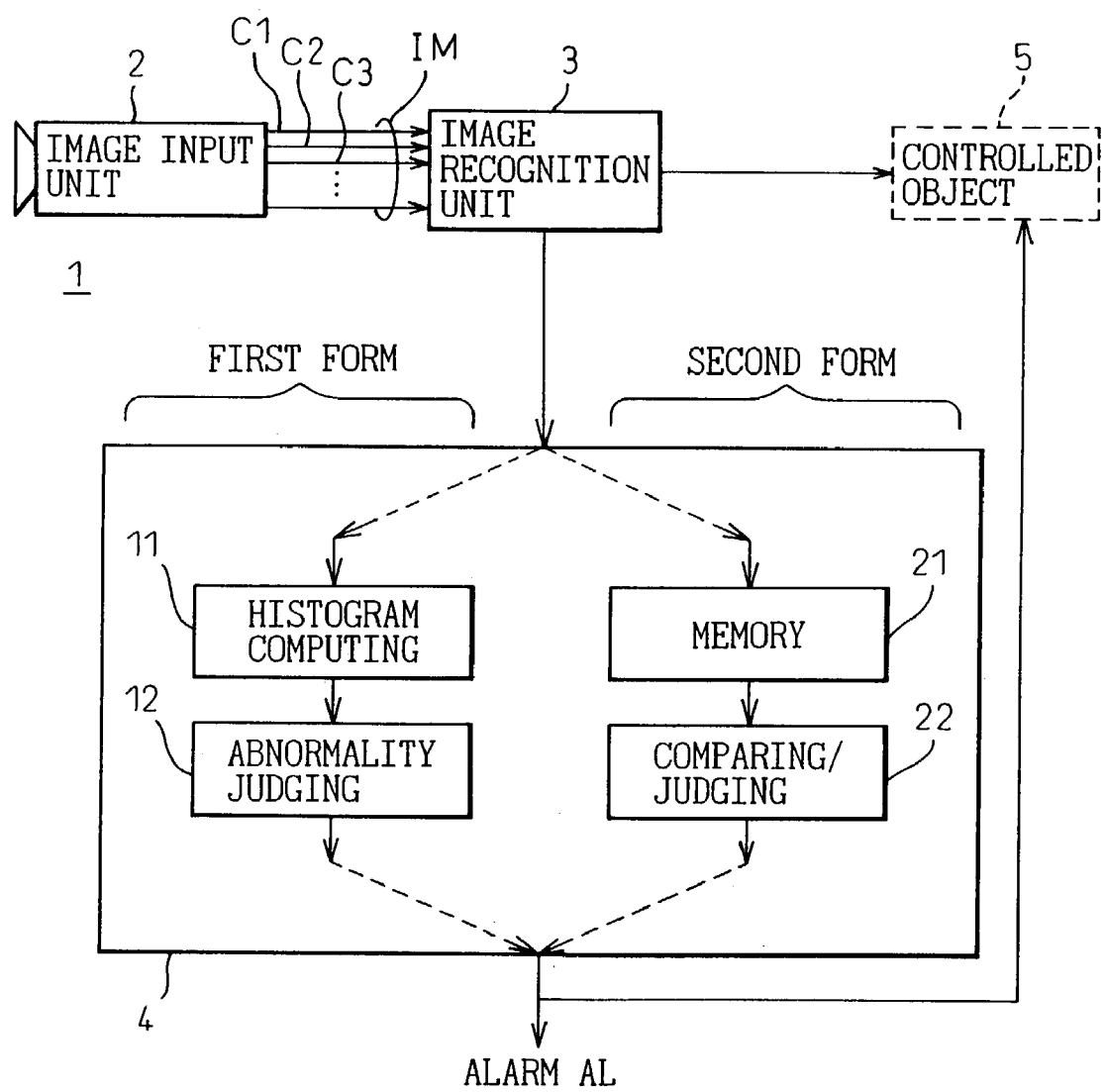
FIG. 1 is a view of the basic configuration of a diagnostic apparatus for abnormalities in an image recognition system according to the present invention.

FIG. 1 is a view of the basic configuration of a diagnostic apparatus for abnormalities in an image recognition system according to the present invention. Note that in the present invention, a first aspect for dealing with breakage of a cable and a second aspect for dealing with pixel burn of the image sensor are separately proposed, but FIG. 1 shows a configuration combining these two aspects. The present invention however can be worked as only the first aspect or worked as only the second aspect. Of course, if combining the two aspects, better results of diagnosis of abnormalities can be obtained.

In FIG. 1, reference numeral 1 shows an image recognition system. This includes an image input unit (camera) 2 and an image recognition unit 3 for receiving as input an image signal IM (image) from the image input unit 2 and recognizing the image. It further includes a diagnostic apparatus 4 for diagnosing abnormalities in the image recognition system 1.

The diagnostic apparatus 4, as shown at the left side in the figure, is provided with a histogram computing means 11 for performing predetermined computation on the image signal IM fetched into the image recognition unit 3 to generate a density histogram and an abnormality judging means 12 for analyzing the density histogram generated at the histogram computing means 11 to judge the presence of an abnormality.

The above configuration forms the already mentioned first aspect of the invention. The abnormality is for example breakage of any of the cords C1, C2, C3 . . . C8 of the 8-bit cable.

Further, the diagnostic apparatus 4, as shown at the right side in the figure, is provided with a memory means 21 for receiving as input and storing information of an image signal IM fetched into an image recognition unit 3 and a comparing/judging means 22 for taking note of one pixel among a plurality of pixels forming the above image, reading out and comparing information of image signals IM of a plurality of images (frame) different in time relating to that noted pixel from the memory means 21, and judging whether they are the same or different. The apparatus judges that there is an abnormality when they are the same.

The above configuration forms the already explained second aspect of the invention. The abnormality is pixel burn occurring in the image sensor of the image input unit (camera) 2.

Note that both the first aspect and second aspect of the diagnostic apparatus 4 are shown led out to the center of FIG. 1 as independent units for easier understanding, but in actuality they may be formed integrally as part of the image recognition unit 3.

The actions of the first aspect and second aspect of the present invention will be explained in detail below with reference to Embodiments 1 to 7 and Embodiments A to H.

Supplementing the explanation of FIG. 1 somewhat, when the diagnosis by the diagnostic apparatus 4 results in detection of an abnormality, the occurrence of that abnormality is immediately informed to the driver of the vehicle by an alarm AL and an alarm signal is instantaneously supplied to the illustrated controlled object 5 as well.

The controlled object 5 is the already explained control device. If this control device is for example a tracking control device for a vehicle in the front, the apparatus immediately actuates a braking operation or other safety operation when receiving the above alarm signal.

Figure 4:
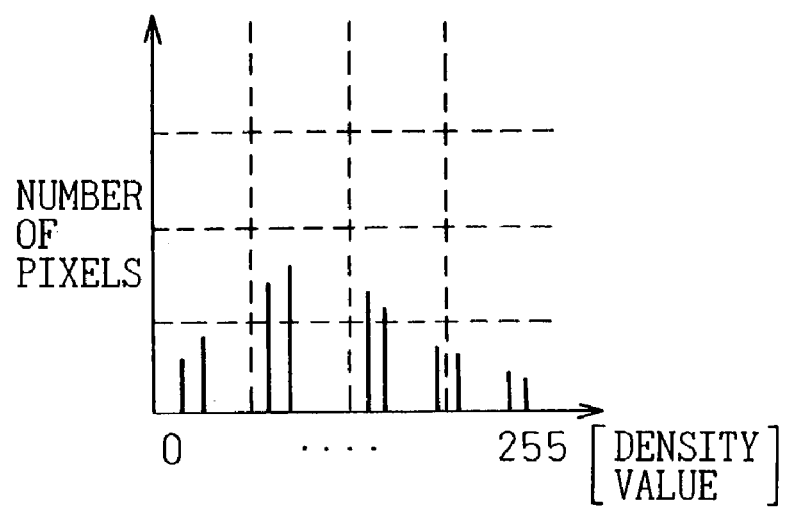
FIG. 4 is a third view of a density histogram for explaining Embodiment 1 of the present invention.
Figure 5:
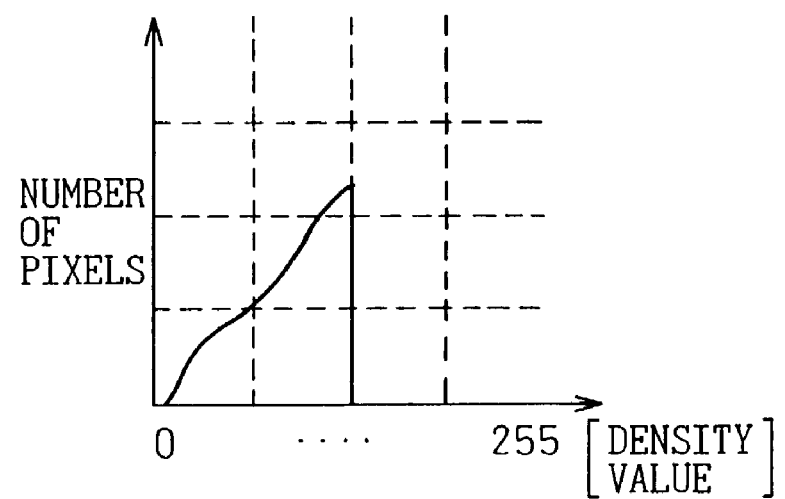
FIG. 5 is a fourth view of a density histogram for explaining Embodiment 1 of the present invention.
Figure 6:
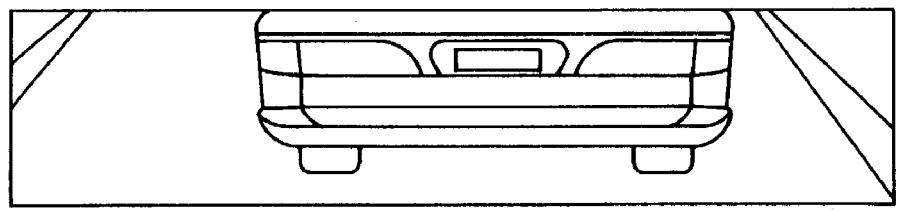
FIG. 6 is a view of an input image used as an example for obtaining the histograms shown in FIG. 2 to FIG. 5.

FIG. 2 to FIG. 5 are views of density histograms for explaining Embodiment 1, FIG. 6 is a view of an input image used as an example for obtaining the histograms of FIG. 2 to FIG. 5, and FIG. 7 is a view of a group of pixels on an image sensor for outputting an input image.

An example of the rear end of a vehicle cruising in front captured by the image sensor (FIG. 7) of the image input unit (camera) 2 mounted in a vehicle is shown as an input image in FIG. 6.

Figure 7:
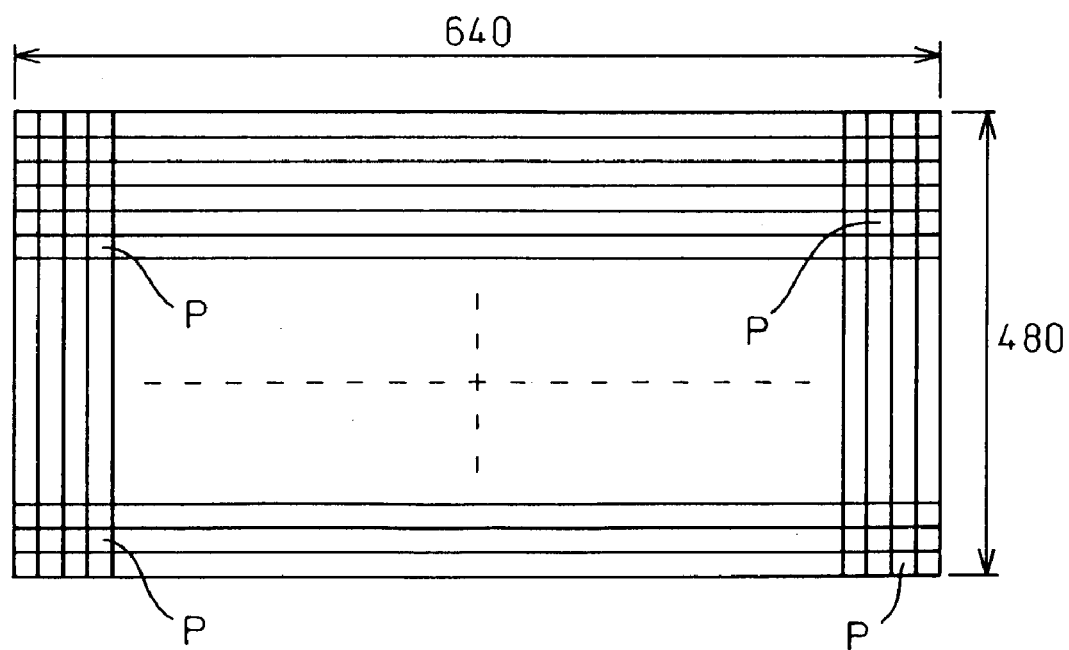
FIG. 7 is a view of a group of pixels on an image sensor outputting an input image.

The input image shown in FIG. 6 is generated by the outputs of pixels (photo diodes) of the image sensor forming the light receiving portion of the image input unit 2 shown in FIG. 1. These pixels, as shown by P in FIG. 7, are arranged for example in a matrix of 640×480 pixels. Further, the outputs of these pixels P are expressed as 8 bits of a signal. These eight bits of the signal are transferred in parallel by the eight-bit cords C1, C2, C3 . . . C8 (FIG. 1).

Figure 2:
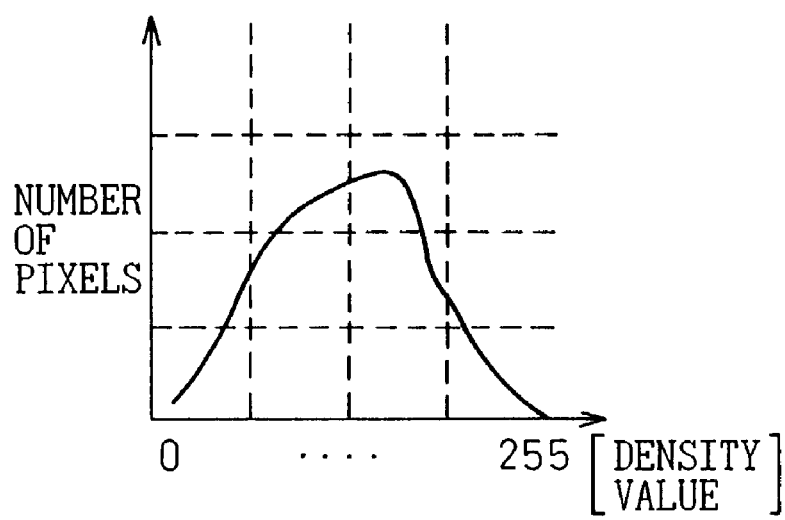
FIG. 2 is a first view of a density histogram for explaining Embodiment 1 of the present invention.

When none of these cords C1 to C8 is broken, that is, when the cable is normal, the density histogram exhibits a clean peaked curve as shown in FIG. 2. Note that a density histogram, as is well known, is expressed by the density values on the abscissa and the number of appearances of pixels P exhibiting those density values in a single image on the ordinate. When one pixel is expressed by 8 bits, there are 256 types of density values from 0 to 255. Normally, these are called "gradations". In the present invention, the term gradation is mainly used.

When none of the cords C1, C2, C3 . . . C8 is broken (when the cable is normal), the density histogram exhibits the clean peaked curve (FIG. 2) as explained above, but if any of these cords C1, C2, C3, . . . C8 breaks (when the cable is abnormal), that peaked curve disappears. Several examples are shown in FIG. 3 to FIG. 5.

Figure 3:
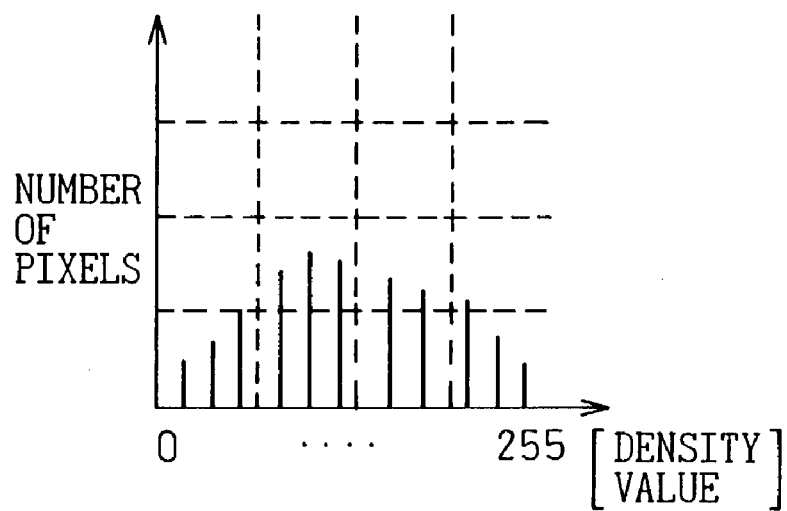
FIG. 3 is a second view of a density histogram for explaining Embodiment 1 of the present invention.

FIG. 3 shows a density histogram when the cord C1 among the eight cords breaks. Here, the cord C1 is for the least significant bit (LSB). In this case, every other value in the profile is missing.

FIG. 4 shows a density histogram when the cord C2 among the eight cords breaks. Here, the cord C2 is for the second bit. In this case, every other two values in the profile are missing.

FIG. 5 shows a density histogram when the cord C8 among the eight cords breaks. Here, the cord C8 is for the most significant bit (MSB). In this case, half of the peaked curve of FIG. 2 is cut away in the profile.

Therefore, in Embodiment 1, the abnormality detecting means 12 of FIG. 1 analyzes the density histogram defined by the number of appearances of the pixels comprising the image for each gradation (0 to 255) and judges that there is an abnormality when not detecting that "a corresponding pixel P appears for all gradations (corresponding to FIG. 2)" (i.e., corresponding to FIG. 3 to FIG. 5).

In Embodiment 2, the means judges that there is an abnormality when confirming that "a corresponding pixel P appears for all gradations (0 to 255)" is not detected a plurality of consecutive times.

Immediately judging there is an abnormality by the fact that there happens to be a pixel where the value of a gradation does not appear would be inaccurate, so an abnormality is judged only after confirming that the result of FIG. 3 or FIG. 4 is obtained or the result of FIG. 2 is not obtained a plurality of consecutive times. By this, it is possible to improve the accuracy of the judgment of abnormalities.

Figure 8:
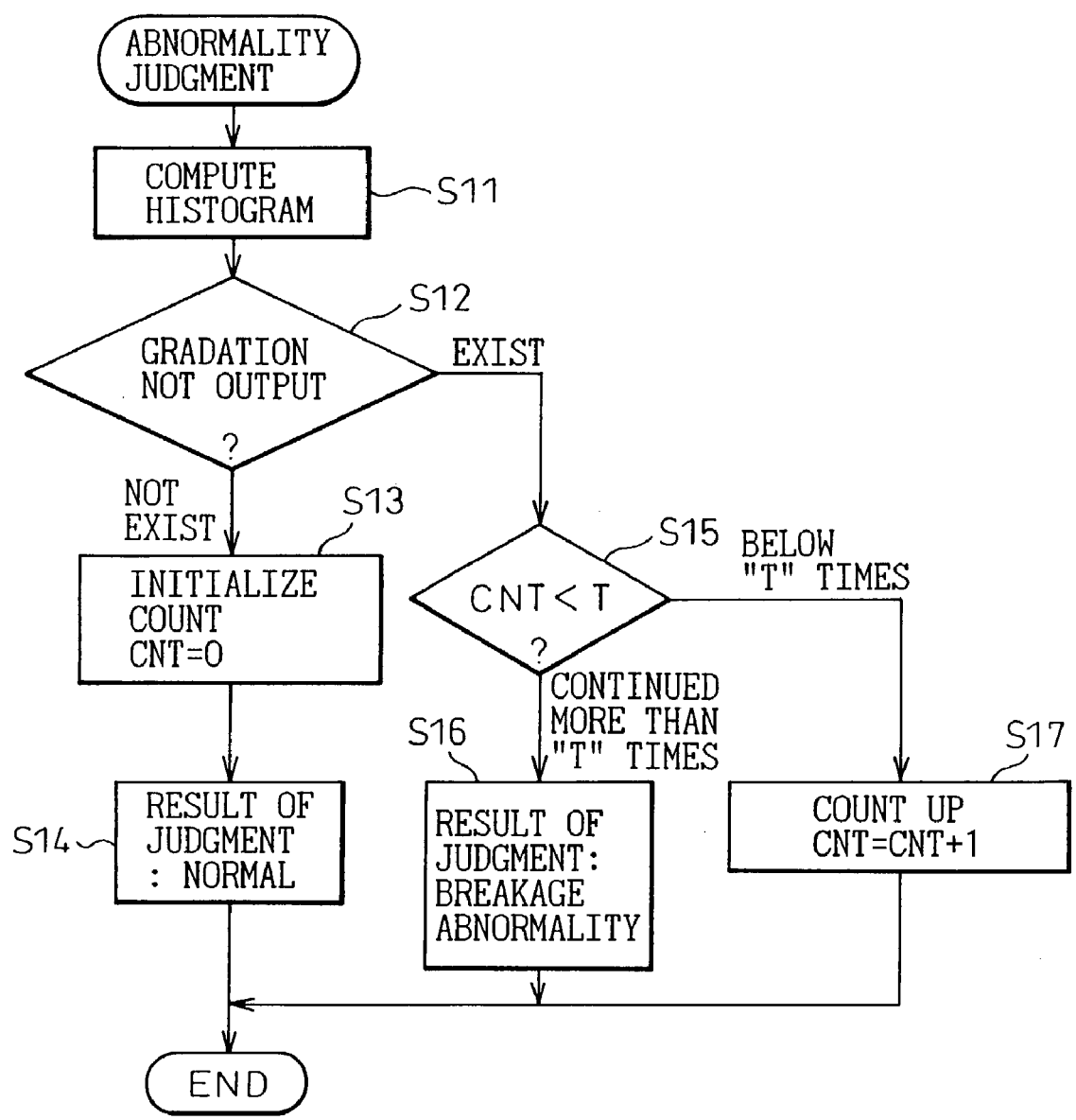
FIG. 8 is a flow chart of an example of the operation of Embodiment 2.

FIG. 8 is a flow chart of an example of the operation of Embodiment 2. The flow chart is comprised of steps S11 to S17.

S11: Start the computation by the histogram computing means 11 (FIG. 1).

S12: Judge if there is any gradation not output.

S13: If there isn't any gradation not output (NO at S12), initialize the counter. The counter is not shown, but can be provided as software or hardware in the abnormality judging means 12 of FIG. 1.

S14: In this case, the situation is judged normal.

S15: When it is judged at S12 that there is a gradation not output (YES at S12), increment the counter and judge whether or not the judgment was performed for exactly the prescribed consecutive number of times T.

S16: If continuing for T or more times, judge that there is a breakage abnormality.

S17: If not more than T, increment the counter and continue with S12.

In Embodiment 3, whether "a corresponding pixel P appears for all of the gradations (0 to 255)" is detected discretely at predetermined sampling intervals.

If performing the above detection substantially consecutively, finer detection is possible, but the processing load of the CPU, forming the main part of the diagnostic apparatus 4, ends up increasing. Therefore, in Embodiment 3, this detection is performed discretely at intervals by sampling.

Figure 9:
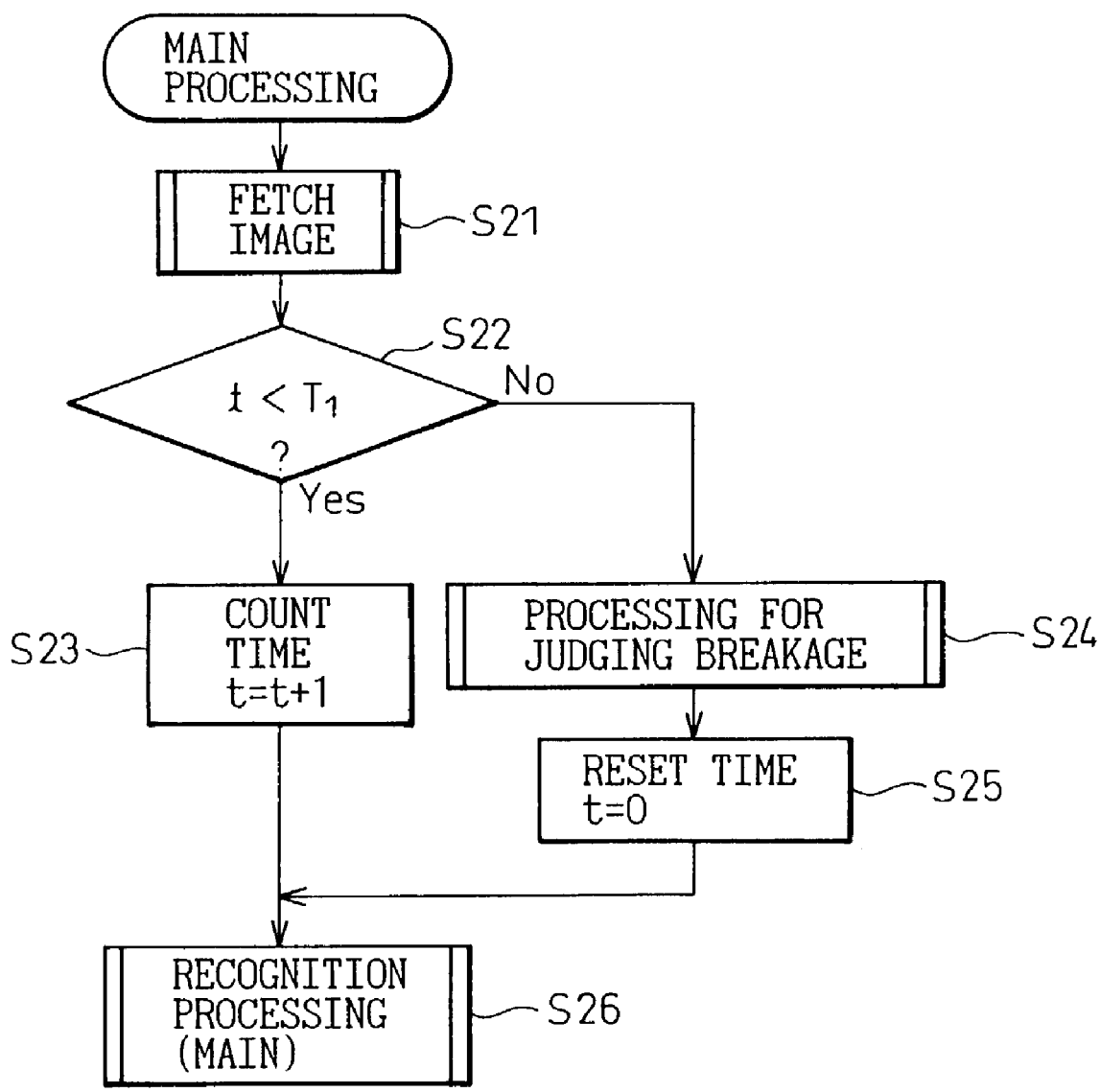
FIG. 9 is a flow chart of an example of the operation of Embodiment 3.

FIG. 9 is a flow chart of an example of the operation of Embodiment 3. The flow chart is comprised of steps S21 to S26.

S21: Fetch the input image from the image input unit (camera) 2 of FIG. 1 to the image recognition unit 3.

S22: Judge if the current time t has reached $T_1$. Here, $T_1$ is the time interval of discrete sampling.

S23: When t does not exceed $T_1$ at S22 (YES), continue to count the current time.

S24: If t exceeds $T_1$ (NO), execute the breakage judgment processing (for example, FIG. 8).

S25: Return the above time t to 0 each time the above breakage judgment processing is executed.

S26: Here, start the inherent image recognition processing.

Due to this, discrete diagnosis of abnormalities lightening the processing load of the CPU is performed.

In Embodiment 4, whether "a corresponding pixel P appears for all of the gradations (0 to 255)" is detected suitably after input of power and also detected together with an existing initial check on the image input unit 2 and image recognition unit 3 at the time of turning on the power before that.

Breakage abnormalities often occur during cruising of a vehicle, but sometimes already are occurring (or occur) when turning on the power in the vehicle. This fact is taken note of by Embodiment 4.

Figure 10:
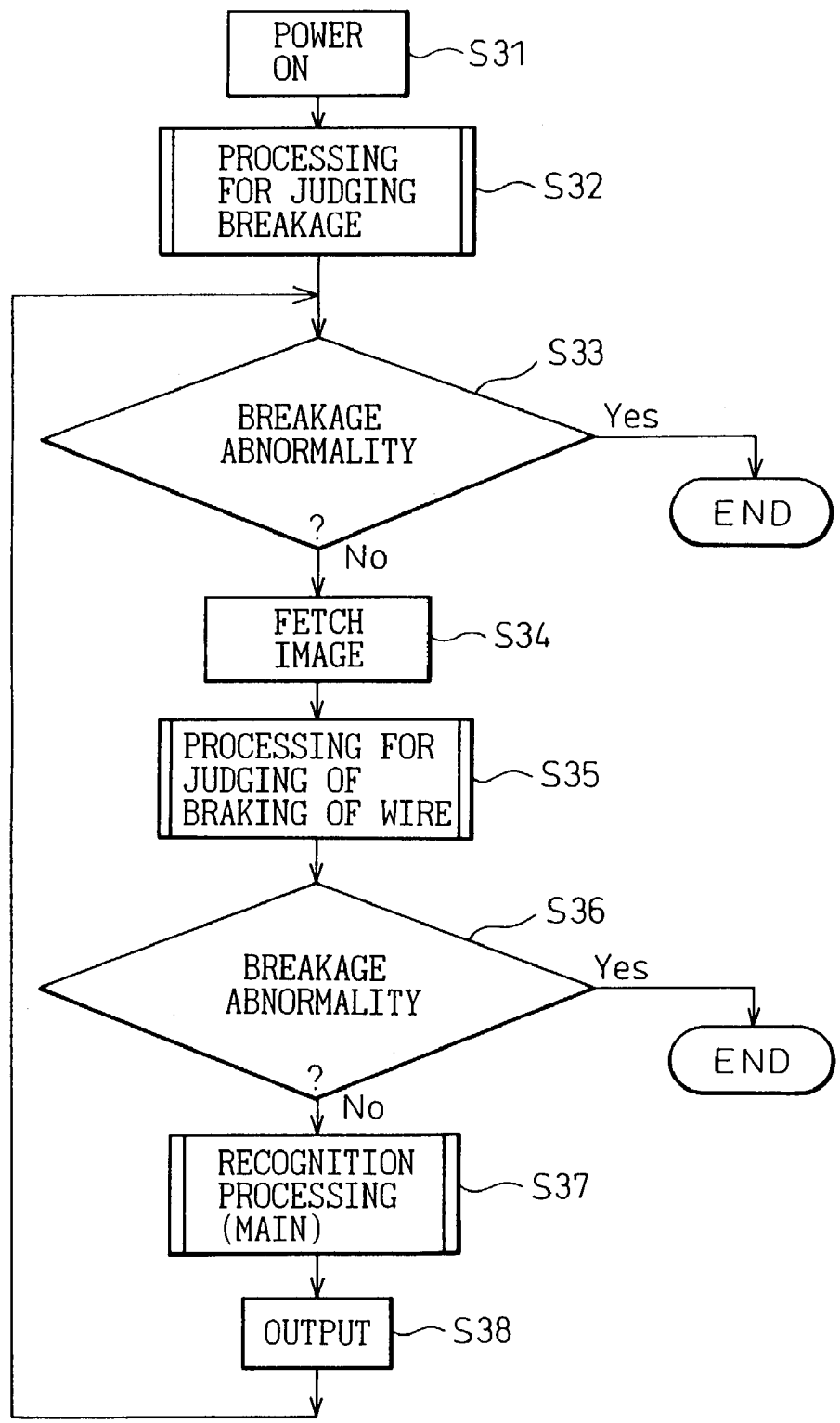
FIG. 10 is a flow chart of an example of the operation of Embodiment 4.

FIG. 10 is a flow chart of an example of the operation of Embodiment 4. In particular, steps S31 to S33 are characterizing steps of this example. Steps S34 to S38 are substantially the same as in the above FIG. 9.

S31: Turn on the power of the vehicle.

S32: Execute the breakage judgment processing (for example, FIG. 8).

S33: When there is a breakage abnormality (YES), the routine ends. When there isn't one (NO), the routine proceeds to S34. The routine after S34 is the same as in FIG. 9.

Therefore, in Embodiment 4, the breakage judgment processing is performed two times (S32 and S35). This would appear at first glance to invite an increase in the processing load of the CPU, but usually when starting a vehicle, there is a routine for automatically executing an initial check of the image recognition system, in particular the image input unit 2 and the image recognition unit 3 of FIG. 1, so if executing the breakage judgment processing S32 making use of this routine, the processing load of the CPU will not become that large.

Here, a look at the prior breakage judgment processing S32 and the ordinary breakage judgment processing S35 shows that the two differ completely in regards to the environment in which the vehicle is placed. That is, in the latter (S35), the vehicle is cruising, while in the former (S32), the vehicle is normally in the garage.

This being the case, in the state with the vehicle in a garage, it would seem that a sufficient density histogram could not be obtained and effective breakage judgment processing (S32) could not be performed. It is true that the effect of the processing (S32) is smaller than the processing (S35). However, normally, an input image constantly finely fluctuates and therefore judgment of the presence of a breakage abnormality is possible.

In Embodiment 5, whether "a corresponding pixel P appears for all of the gradations (0 to 255)" is detected selectively only when it is judged that the fluctuations in the density histogram are large in accordance with the surroundings.

When the vehicle is placed in surroundings where only output of an image of dark gradations can be obtained such as at night, there is a possibility that all gradations will not be output.

Therefore, it is possible to judge whether it is daytime or nighttime from (i) the signal of the input image, (ii) the signal of the sensor for turning on the headlight of the vehicle automatically in dark surroundings, that is, the so-called light control system, etc. and selectively detect for breakage only in the daytime when the fluctuations in the density histogram are large. Alternatively, it is also possible to selectively detect for breakage only while the vehicle is cruising and the fluctuations in the density histogram are large based on the signal of the vehicle speed sensor.

In Embodiment 6, when it is judged from the surroundings that the fluctuations in the density histogram are small, whether "a corresponding pixel P appears for all of the gradations (0 to 255)" is detected after determining that any of the shutter speed, automatic gain control (AGC), or iris has been operated.

As explained above, if the surroundings of the vehicle are dark or the vehicle is at a stop, the fluctuations in the density histogram inevitably become smaller. Therefore, at such times, effective breakage judgment processing is difficult to realize.

Therefore, in Embodiment 6, it is determined when the density of the input image will become larger and the breakage judgment processing is executed at that time.

Figure 11:
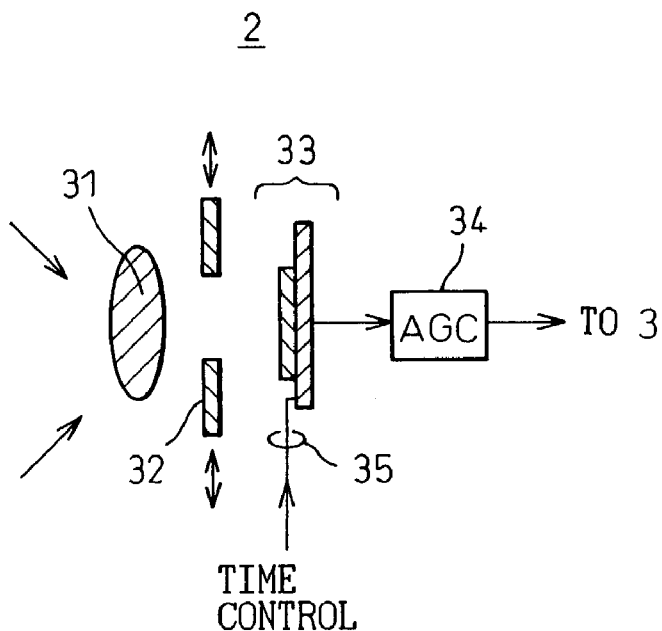
FIG. 11 is a view illustrating a case effective for working Embodiment 6.

FIG. 11 is a view illustrating a case effective for working Embodiment 6.

This figure shows the image sensor portion of the image input unit (camera) 2 of FIG. 1, in particular the structures of the front end and rear end. In the figure, reference numeral 31 is a lens. At the rear end, there is an iris 32 for adjusting the amount of light striking the image sensor 33, a shutter for adjusting the total amount of the incident light, and an AGC circuit 34 for applying AGC to the image signal input from the image sensor 33. Note that the shutter may be a typical mechanical shutter, but in the figure an electronic type shutter 35 for controlling the exposure time is illustrated.

No matter which of these components 32, 34, and 35 is operated, at that time, large fluctuations occur in the density histogram, so just those times should be determined to execute the breakage judgment processing.

Embodiment 6, like Embodiment 3, also has the advantage of being able to reduce the processing load of the CPU.

Embodiment 7 further provides an abnormality locating means for judging if a density profile pattern shown by the density histogram at the time of detection has a trend close to any of a plurality of abnormality patterns envisioned in advance when detecting whether "a corresponding pixel P appears for all of the gradations (0 to 255)" and, when having that trend, locating the abnormality envisioned unambiguously from the abnormality patterns.

Figure 12:
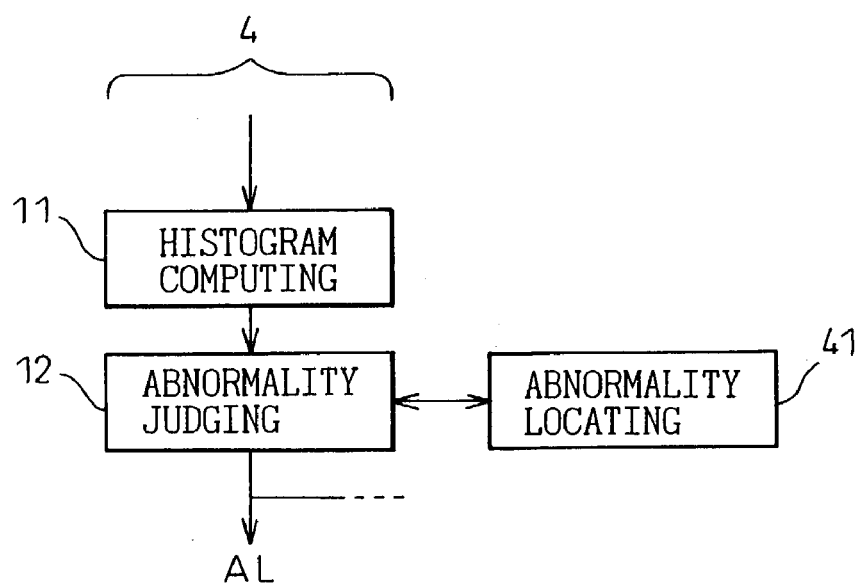
FIG. 12 is a view of a diagnostic apparatus for abnormalities according to Embodiment 7.

FIG. 12 is a view of a diagnostic apparatus for abnormalities according to an embodiment 7.

Embodiment 7 is configured as configured in FIG. 1 plus the above abnormality locating means 41. Explaining this abnormality locating means a bit more in detail, the result is the following (i) or (ii).

(i) The abnormality locating means 41 concludes that no abnormality has occurred and the situation is normal when judging that the density profile pattern shown by the density histogram at the time of detection does not have a trend close to any of the above-mentioned plurality of abnormality patterns even if the abnormality judging means 12 detects that a corresponding pixel P does not appear for any of the gradations (0 to 255).

(ii) The abnormality judging means 41 takes note of only for example the initial gradation 0 and the final gradation 255 and judges the appearance of a corresponding pixel P for them even when gradations (0 to 255) are set corresponding to the plurality of stages from the initial gradation 0 to the final gradation 255. At that time, the abnormality locating means 41 locates a unique abnormality when judging that the pixel P does not appear.

In the case of the 8-bit cable (comprising cords C1 to C8) explained above, the output has 256 gradations (0 to 255). When breakage occurs, just the graduations of a certain bit of the signal can no longer be output. If the cord C8 for the MSB among the eight bits is disconnected, the gradations on the input image become 0 to 128. Similarly, if the cord C1 for the LSB is broken, the output gradations skip values and become the 128 gradations of 0, 2, 4 . . . 254. In this way, in the case of breakage, some sort of trend appears, so it is possible to judge breakage based on this trend.

As opposed to this, even if there are gradations which are not output, it is possible to judge the situation is normal when there is no particular trend in the gradations of the pixel output.

Further, if looking at the gradation 0 and the gradation 255, the HIGH/LOW of all cords are reversed. From this, even if reducing the gradations searched through, it is possible to similarly judge the presence of any breakage. According to this, it becomes possible to judge normal/abnormal from the output results of fewer gradations.

The above explanation concerned the first aspect of the invention. Next, the second aspect of the invention will be explained in more detail. As already explained, the abnormality covered by the second aspect is pixel burn occurring in the image sensor 33 of the image input unit (camera) 2. Further, to detect such pixel burn, as shown at the right side of the above-mentioned FIG. 1, provision is made of a memory means 21 for receiving as input and storing the information of the image signal IM fetched into the image recognition unit 3 and a comparing/judging means 22 for taking note of one pixel in the plurality of pixels forming an image, reading out and comparing information of image signals IM of a plurality of images (frames) different in time relating to a target pixel from the memory means 21, and judging whether the information are the same or different. The apparatus judges that there is an abnormality when they are the same.

Here, to accelerate understanding, the state of an abnormality due to pixel burn is shown in the figures.

Figure 13A:
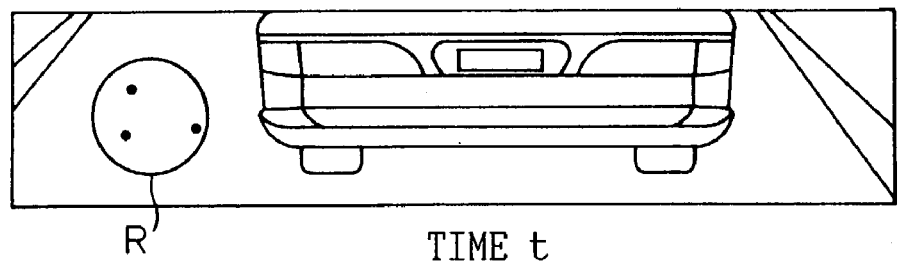
FIG. 13($a$) and FIG. 13($b$) are views of examples of input images when pixel burn occurs.
Figure 13B:
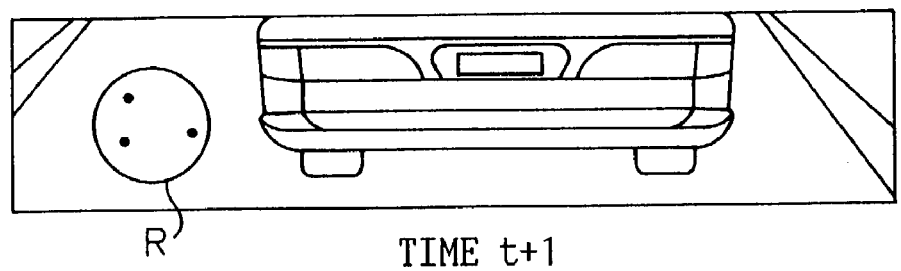

FIG. 13(a) and FIG. 13(b) are views showing examples of input images when pixel burn occurs.

This example shows an input image capturing the rear end of a vehicle in the same way as FIG. 6. What should be noted in FIG. 13(a) and FIG. 13(b) are the portions surrounded by the circles R. Three black dots appear. These black dots appear at the portions of the same pixels both at the time t and at a time t+1 after the elapse of time from this. This means pixel burn.

In Embodiment A, the comparing/judging means 22 (FIG. 1) detects any change between information of a current image signal and information of a prior image signal within a certain time (for example, 1 second) set in advance for the same pixel and judges that there is an abnormality when there is no change.

In Embodiment B, the comparing/judging means 22 divides an image in advance into a plurality of sub-image areas, shifts each sub-image area in time, and then executes the comparison and judgment for each of these.

Figure 14:
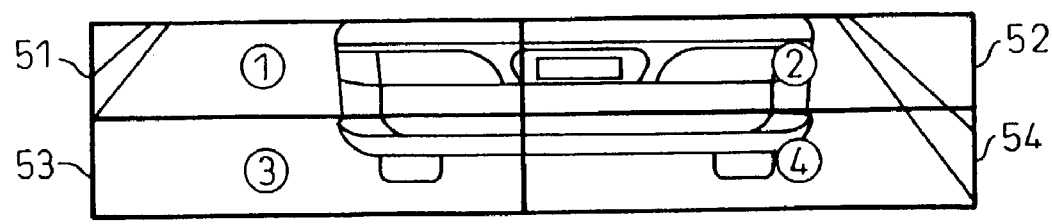
FIG. 14 is a view of an example of division of an image.

FIG. 14 is a view of an example of division of an image. Note that the input image covered is the same as that shown in FIG. 6 and FIG. 13.

In the example of FIG. 14, the case is shown of dividing the image into the four sub-image areas 51, 52, 53, and 54. Here, the above comparison and judgment are performed by time division for each of the four sub-image areas 51 to 54. Therefore, the required capacity of the memory means 21 (FIG. 1) need only be one-quarter the regular capacity. The operation will be explained below.

Figure 15:
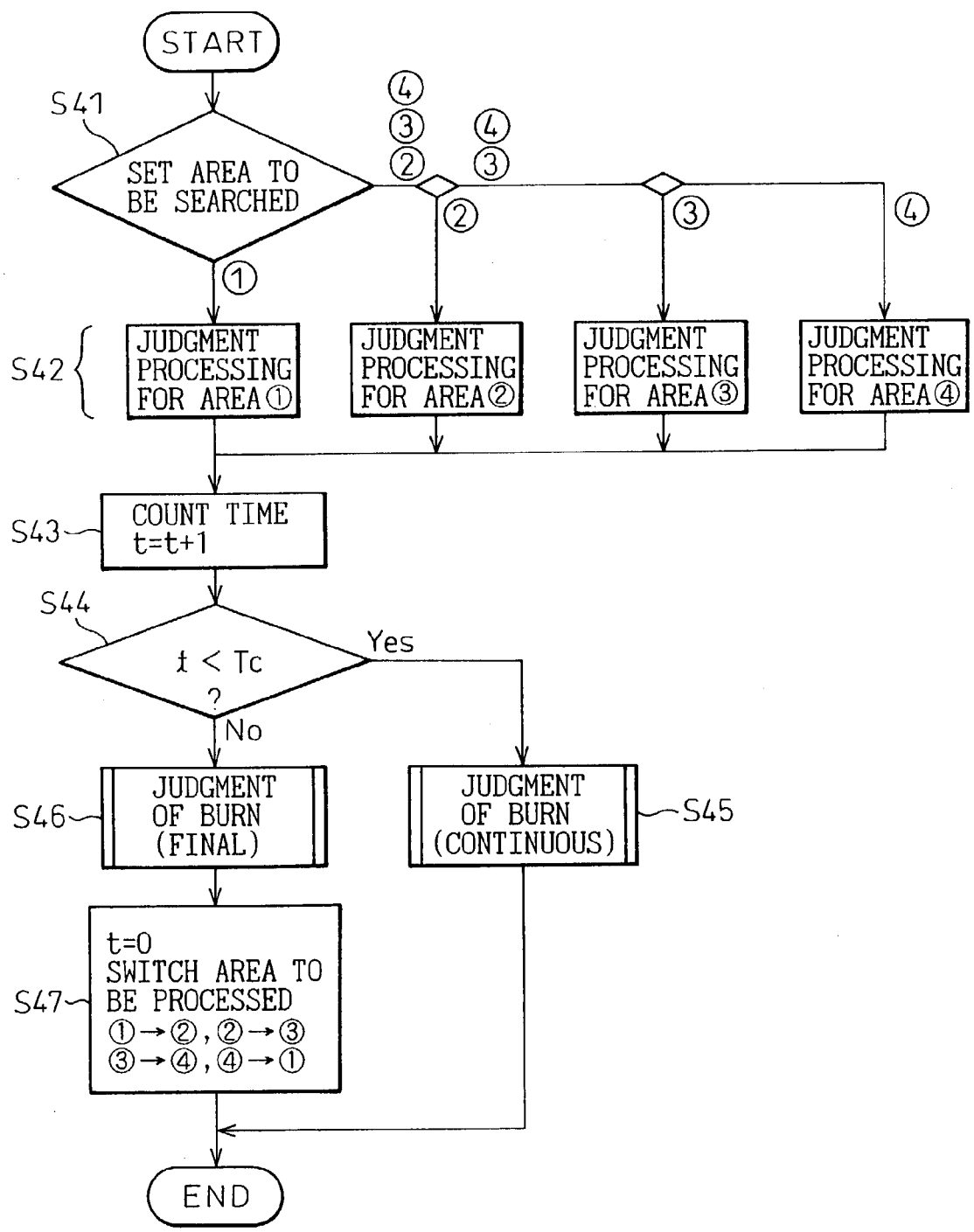
FIG. 15 is a flow chart of an example of operation of Embodiment B.

FIG. 15 is a flow chart of an example of the operation of Embodiment B. The flow chart is comprised of steps S41 to S47.

S41: Set one of the four search areas (51 to 54) shown in FIG. 14. First, set the area 51.

S42: Perform the processing for judging pixel burn for the area 51.

S43: Increment the time count for the above-mentioned "time shift" (counter formed as software or hardware in comparing/judging means 22).

S44: Judge if that time is over the above certain time (for example, 1 second) Tc.

S45: If not over it (YES at S44), continue the pixel burn judgment processing.

S46: If over it (NO at S44), the result of pixel burn judgment processing is determined.

S47: Reset the time t to 0 again, switch the search area at S42 from the area 51 to the area 52, and repeat the above in the same way for S43→S44→S45→S46→S47. At S47, next switch from the area 52 to the area 53.

In Embodiment C, further provision is made of an abnormal pixel candidate memory means for storing only a plurality of abnormal pixel candidates judged once to be abnormal by the comparing/judging means 22. The comparing/judging means 22 continues to repeatedly execute comparison and judgment only for the abnormal pixel candidates in the abnormal pixel candidate memory means. Each time it is judged that the information are different, the abnormal pixel candidate is erased from the abnormal pixel candidate memory means.

FIG. 16 is a view of a diagnostic apparatus for abnormalities according to Embodiment C.

Embodiment C is configured as configured in FIG. 1 (second aspect of the invention) plus the above abnormality pixel candidate memory means 61.

The pixel burn judgment processing by the comparing/judging means 22 (for example, S45 and S46 of FIG. 15) is repeated at a certain set cycle. It records candidates of pixels with no change in gradation first in the memory means 61. Pixels with changes in gradations among these candidates are successively erased with each repetition of this cycle. The candidate pixels remaining at the end are the true burn pixels sought. This operation is shown in FIG. 17.

FIG. 17(a) and FIG. 17(b) are flow charts of an example of the operation of Embodiment C. This is comprised of steps S51 to S53.

S51: Extract the position of the coordinates with changes in gradation by the comparing/judging means 22.

S52: Refer to the memory means 21 and compare these with the previous data.

S53: Using the results of the comparison, store the data on candidates for abnormal pixels in the memory means 61 in the data format of FIG. 17(b) for pixels with no changes in gradation.

In Embodiment D, further provision is made of a no-change flag recording means for recording corresponding to each pixel a no-change flag showing that it has been judged once by the comparing/judging means 22 that there is no change between information. The comparing/judging means 22 continues to repeatedly execute the comparison and judgment only for pixels with no-change flags in the no-change flag recording means. Each time it is judged that the information are different, the no-change flag corresponding to that pixel is erased from the no-change flag recording means.

Figure 18:
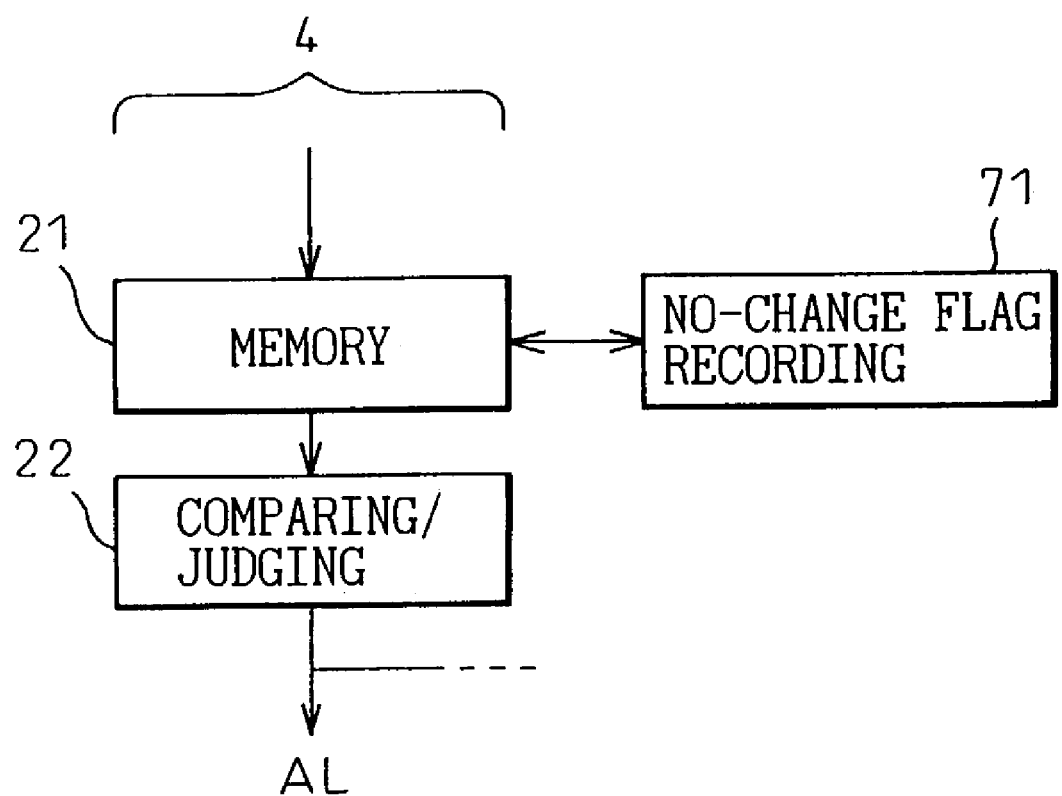
FIG. 18 is a view of a diagnostic apparatus for abnormalities according to Embodiment D.

FIG. 18 is a view of a diagnostic apparatus for abnormalities according to an Embodiment D.

Embodiment D is configured as configured in FIG. 1 (second aspect of the invention) plus the above no-change flag recording means 71.

While Embodiment C recorded the data shown by FIG. 17(b), Embodiment D records flags showing if there has been a change in the corresponding pixels in the recording means 71. The flags show only whether there has been a change, so 1 bit is sufficient. Therefore, Embodiment D enables a great reduction in the required memory capacity.

FIGS. 19(a), 19(b), 19(c), and 19(d) are views simply showing the operation of Embodiment D.

FIG. 19(b) is a record of the no-change flags (shown by hatching) obtained by the current pixel burn judgment processing.

The record (b) of the no-change flags is compared with the record of the no-change flags the previous time (FIG. 19(a)) to obtain a record of no-change flags present at both of (a) and (b) (FIG. 19(c)).

The record (c) of the no-change flags is used for the next pixel burn judgment processing. The pixels which should be noted at this time are reduced to two in the example of FIG. 19(c). Therefore, the processing load on the CPU becomes lighter.

FIG. 19(d) shows another example of the results of the "prior pixel burn judgment processing". In summary, even if the current processing is not performed for all pixels, efficient processing is possible by comparing and processing only the three pixels with no change of the previous time.

In Embodiment E, the above comparison and judgment are executed suitably after input of power and also executed together with an existing initial check on the image input unit 2 and image recognition unit 3 at the time of turning on the power before that.

Note that Embodiment E is exactly the same in content and effect as in Embodiment 4.

In Embodiment F, the above-mentioned comparison and judgment are selectively performed only when it is judged that the information of the image signal is obtained effectively in accordance with the surroundings.

Note that Embodiment F is exactly the same in content and effect as in Embodiment 5.

In Embodiment G, the above comparison and judgment are executed after obtaining a grasp of operation of any of the shutter speed, AGC, or iris at the image input unit 2.

Note that Embodiment G is exactly the same in content and effect as in Embodiment 6.

Finally, Embodiment H will be explained. In this Embodiment H, further provision is made of a pixel information reproducing means for reproducing information of a pixel signal which should have been obtained from a pixel P judged to be abnormal by interpolation from information on pixel signals obtained from adjacent pixels surrounding the pixel P.

Figure 20:
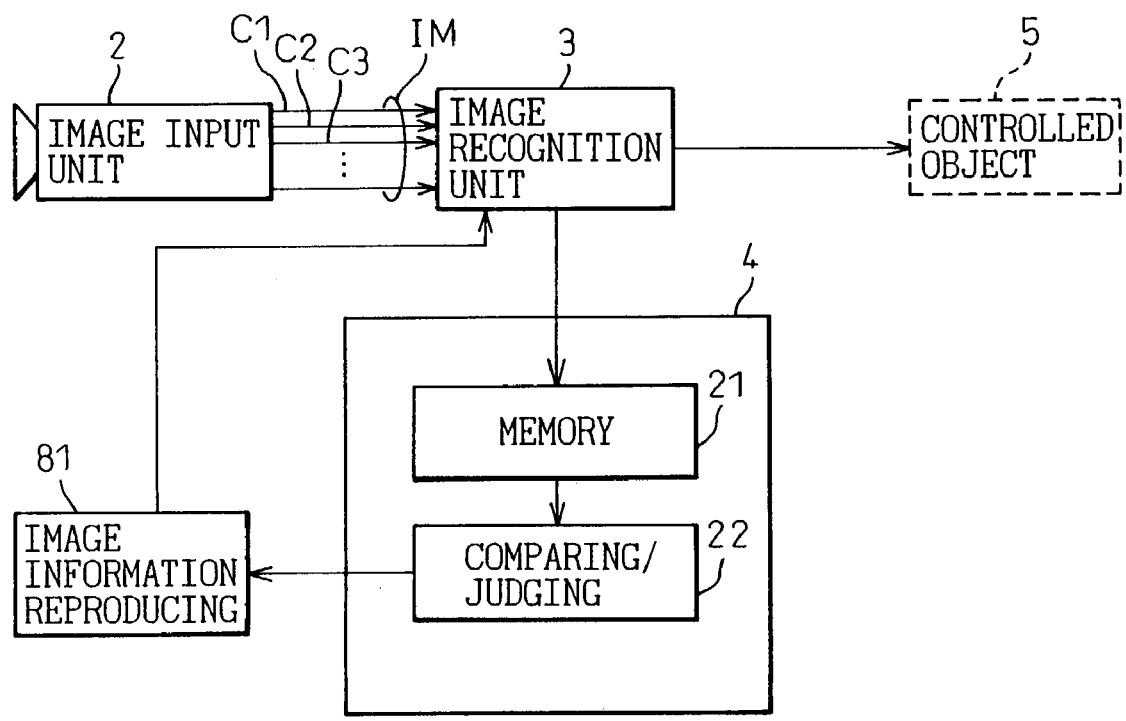
FIG. 20 is a view of a diagnostic apparatus for abnormalities according to Embodiment H.

FIG. 20 is a view of a diagnostic apparatus for abnormalities according to Embodiment H.

Embodiment H is configured as configured in FIG. 1 (second aspect of invention) plus the above image information reproducing means 81. Note that the illustration of the alarm (AL) signal line is omitted.

FIG. 21(a), FIG. 21(b), and FIG. 21(c) are views for explaining the interpolation in Embodiment H.

In the figures, FIG. 21(a) shows that the pixel at the coordinates (x+1, y) is a burned pixel P'.

The gradation of the burned pixel P' is interpolated from the gradations of the surrounding pixels, that is, P(x,y) and P(x+2, y). This state is shown in FIG. 21(b).

One example of the interpolation formula used at this time is shown in FIG. 21(c). According to this formula, there are 81 (=(136+25)/2) reproduced gradations.

Note that Embodiment H is preferably applied to the portion of an image not having that much of an effect on image recognition, for example, a portion away from the center of the image such as shown by R in FIG. 13(a) and FIG. 13(b).

Summarizing the effects of the invention, as explained above, according to the present invention, it is possible to realize a diagnostic apparatus able to quickly and accurately detect abnormalities in an image recognition system such as breakage occurring at a cable from an image sensor or pixel burn in the image sensor.

While the invention has been described with reference to specific embodiments chosen for purpose of illustration, it should be apparent that numerous modifications could be made thereto by those skilled in the art without departing from the basic concept and scope of the invention.

What is claimed is:

1. A diagnostic apparatus for detecting abnormalities in an image recognition system including an image input unit and an image recognition unit for receiving as input an image signal from said image input unit and performing image recognition on said image, provided with
a histogram computing unit to perform predetermined computations on an image signal fetched into said image recognition unit to generate a density histogram and
an abnormality judging unit to analyze the density histogram generated by said histogram computing unit to judge the presence of an abnormality.

2. A diagnostic apparatus as set forth in claim 1, wherein said abnormality judging unit analyzes said density histogram defined by the number of appearances of pixels composing said image for each gradation and judging that there is said abnormality when not detecting that "a corresponding pixel appears for all gradations".

3. A diagnostic apparatus as set forth in claim 2, wherein said abnormality judging unit judges that there is said abnormality when confirming "a corresponding pixel appears for all gradations" is not detected a plurality of consecutive times.

4. A diagnostic apparatus as set forth in claim 2, wherein whether "a corresponding pixel appears for all gradations" is detected discretely at predetermined sampling intervals.

5. A diagnostic apparatus as set forth in claim 2, wherein whether "a corresponding pixel appears for all gradations" is detected suitably after input of power and also detected together with an existing initial check on the image input unit and image recognition unit at the time of turning on the power before that.

6. A diagnostic apparatus as set forth in claim 2, wherein whether "a corresponding pixel appears for all gradations" is detected only when it is judged that the fluctuations in the density histogram are large in accordance with the surroundings.

7. A diagnostic apparatus as set forth in claim 2, wherein when it is judged from the surroundings that the fluctuations in the density histogram are small, whether "a corresponding pixel appears for all of the gradations" is detected after determining that any of the shutter speed, AGC, or iris has been operated at the image input unit.

8. A diagnostic apparatus as set forth in claim 2, further provided with an abnormality locating unit to judge if a density profile pattern shown by the density histogram at the time of detection has a trend close to any of a plurality of abnormality patterns envisioned in advance when detecting whether "a corresponding pixel appears for all of the gradations" and, when having that trend, locates occurrence of the abnormality envisioned unambiguously from the abnormality patterns.

9. A diagnostic apparatus as set forth in claim 8, wherein said abnormality locating unit concludes that no abnormality has occurred and the situation is normal when judging that the density profile pattern shown by the density histogram at the time of detection does not have a trend close to any of the above-mentioned plurality of abnormality patterns even if the abnormality judging unit detects that a corresponding pixel does not appear in any of the gradations.

10. A diagnostic apparatus as set forth in claim 8, wherein said abnormality judging unit takes note of only the initial gradation and the final gradation and judges the presence of a pixel corresponding to them when gradations are set corresponding to the plurality of stages from the initial gradation to the final gradation and wherein said abnormality locating unit locates a unique abnormality when judging that the pixel does not appear.

11. A diagnostic apparatus for detecting abnormalities in an image recognition system including an image input unit and an image recognition unit for receiving an image signal from said image input unit and performing image recognition on said image, provided with
a memory unit to receive as input and storing information of said image signal fetched into said image recognition unit and
a comparing/judging unit to read out and compare information of image signals of a plurality of images different in time relating to a target pixel from the memory unit and judge whether they are the same or different, which apparatus judges that there is an abnormality when the information are the same.

12. A diagnostic apparatus as set forth in claim 11, wherein said comparing/judging unit detects any change between information of a current image signal and information of a prior image signal within a certain time set in advance and judges that there is an abnormality when there is no change.

13. A diagnostic apparatus as set forth in claim 11, wherein said comparing/judging unit divides an image in advance into a plurality of sub-image areas, shifts each sub-image area in time, and then executes said comparison and judgment for each of these.

14. A diagnostic apparatus as set forth in claim 11, wherein
further provision is made of an abnormal pixel candidate memory unit to store only a plurality of abnormal pixel candidates judged once to be abnormal by said comparing/judging unit, and
said comparing/judging unit continues to repeatedly execute comparison and judgment only for abnormal pixel candidates in the abnormal pixel candidate memory unit and, each time it is judged that the information are different, erases the abnormal pixel candidate from the abnormal pixel candidate memory unit.

15. A diagnostic apparatus as set forth in claim 11, wherein
further provision is made of a no-change flag recording unit to record corresponding to each pixel a no-change flag showing that it has been judged once by said comparing/judging unit that there is no change between information, and
said comparing/judging unit continues to repeatedly execute said comparison and judgment only for pixels corresponding to no-change flags in the no-change flag recording unit and, each time it is judged that the information are different, erases the no-change flag corresponding to that pixel from the no-change flag recording unit.

16. A diagnostic apparatus as set forth in claim 11, wherein said comparison and judgment are executed suitably after input of power and also executed together with an existing initial check on said image input unit and said image recognition unit at the time of turning on the power before that.

17. A diagnostic apparatus as set forth in claim 11, wherein said comparison and judgment are selectively executed only when it is judged that the information of said image signal is obtained effectively in accordance with the surroundings.

18. A diagnostic apparatus as set forth in claim 11, wherein said comparison and judgment are executed after determining operation of any of the shutter speed, AGC, or iris at said image input unit.

19. A diagnostic apparatus as set forth in claim 11, further provided with a pixel information reproducing unit to reproduce information of a pixel signal which should be obtained from a pixel judged to be abnormal by interpolation from information on pixel signals obtained from pixels surrounding that pixel.

* * * * *